United States Patent
Yang et al.

(10) Patent No.: US 12,469,864 B2
(45) Date of Patent: Nov. 11, 2025

(54) TEMPERATURE CONTROL SYSTEM FOR FUEL CELL AND TEMPERATURE CONTROL METHOD THEREOF

(71) Applicant: CATARC New Energy Vehicle Test Center (Tianjin) Co., Ltd., Tianjin (CN)

(72) Inventors: Zirong Yang, Tianjin (CN); Dong Hao, Tianjin (CN); Minghui Ma, Tianjin (CN); Yanyi Zhang, Tianjin (CN); Ruidi Wang, Tianjin (CN); Jianwei Li, Tianjin (CN); Zhensen Ding, Tianjin (CN); Renguang Wang, Tianjin (CN)

(73) Assignee: CATARC NEW ENERGY VEHICLE TEST CENTER (TIANJIN) CO., LTD., Tianjin (CN)

( * ) Notice: Subject to any disclaimer, the term of this patent is extended or adjusted under 35 U.S.C. 154(b) by 328 days.

(21) Appl. No.: 18/358,148

(22) Filed: Jul. 25, 2023

(65) Prior Publication Data
US 2024/0047719 A1 Feb. 8, 2024

(30) Foreign Application Priority Data

Aug. 2, 2022 (CN) .......................... 202210923236.7

(51) Int. Cl.
*H01M 8/04* (2016.01)
*G01R 31/378* (2019.01)
(Continued)

(52) U.S. Cl.
CPC ...... *H01M 8/04731* (2013.01); *G01R 31/378* (2019.01); *H01M 8/04029* (2013.01); *H01M 8/04074* (2013.01); *H01M 8/04365* (2013.01)

(58) Field of Classification Search
CPC ......... H01M 8/04731; H01M 8/04029; H01M 8/04074; H01M 8/04365
See application file for complete search history.

(56) References Cited

U.S. PATENT DOCUMENTS

| 2009/0214913 | A1 | 8/2009 | Gschwind |
| 2011/0117465 | A1 | 5/2011 | Yajima et al. |
| 2024/0204223 | A1* | 6/2024 | Itaya .................. H01M 8/0432 |

FOREIGN PATENT DOCUMENTS

| CN | 101261056 A | 9/2008 |
| CN | 108387991 A | 8/2018 |

(Continued)

OTHER PUBLICATIONS

First Office Action in Corresponding Chinese Application No. 202210923236.7, dated Sep. 9, 2022; 10 pgs.
(Continued)

*Primary Examiner* — Olatunji A Godo
(74) *Attorney, Agent, or Firm* — PORUS IP LLC

(57) ABSTRACT

A temperature control system for fuel cell includes a fuel cell under test, having two end plates, and the end plates having an area. At least two temperature regulating modules, respectively on a surface of one side of the two end plates facing outside of the fuel cell under test, and an area of a heat radiation surface of the temperature regulating module opposite the end plates is greater than or equal to a first preset proportion of the first preset value. At least two temperature detection modules, mounted to the cathode and anode of the fuel cell under test, for obtaining a measured temperature. A control module, connected to the temperature detection module and connected to the temperature regulating module, for controlling of the two temperature regulating modules to regulate the measured temperature of the cathode and anode to tend to a target temperature.

1 Claim, 3 Drawing Sheets

(51) Int. Cl.
  *H01M 8/04007* (2016.01)
  *H01M 8/04029* (2016.01)
  *H01M 8/0432* (2016.01)
  *H01M 8/04701* (2016.01)

(56) References Cited

FOREIGN PATENT DOCUMENTS

| CN | 110544782 A | 12/2019 |
| CN | 113696715 A | 11/2021 |

OTHER PUBLICATIONS

Search Report in Corresponding Chinese Application No. 202210923236.7, dated Sep. 5, 2022; 2 pgs.
The Second Office Action in Chinese Application No. 202210923236.7 mailed on Sep. 28, 2022, 20 pages.
Decision to Grant a Patent in Chinese Application No. 202210923236.7 mailed on Oct. 24, 2022, 5 pages.

\* cited by examiner

TEMPERATURE CONTROL SYSTEM FOR FUEL CELL AND TEMPERATURE CONTROL METHOD THEREOF

RELATED APPLICATIONS

The present application claims priority from Chinese Application Number 202210923236.7, filed Aug. 2, 2022, the disclosure of which is hereby incorporated by reference herein in its entirety.

FIELD

The present disclosure relates to the field of proton exchange membrane fuel cells, and in particular relates to a temperature control system for fuel cell and a temperature control method thereof.

BACKGROUND

Proton exchange membrane fuel cell is a highly efficient energy conversion device and is considered as one of the clean power sources with promising disclosures in the transportation industry.

While the electrochemical reaction occurs inside the fuel cell to generate electrical energy, it is accompanied by the generation of heat, and the heat production rises with the increase of operating current density. If the heat cannot be discharged in time, the temperature of the fuel cell will continue to rise, affecting the internal hydrothermal transport process and possibly causing a membrane drying phenomenon, thus reducing the overall output performance. In addition, high temperature of the fuel cell may cause damage to a microstructure of a membrane electrode assembly, reducing the overall life and durability of the fuel cell. If the heat production of the fuel cell is low and cannot support it to reach the expected operation temperature, it is not conducive to the electrochemical reaction and cannot make the fuel cell achieve better output performance. Therefore, it is critical to maintain the fuel cell in the proper temperature range for operation.

For a single fuel cell, a common method of temperature rise control is to arrange a resistance wire in a test clamp of the single fuel cell and use ohmic heat for heating. There are two common methods of heat dissipation control, one relies on natural convection heat transfer between the single fuel cell and the environment, and the other uses a cooling fan to achieve forced convection heat transfer between the single fuel cell and the environment. Although the cooling fan control method requires simple equipment and is easy to operate, it is usually only applicable to the single fuel cell with small area (e.g., 25 $cm^2$, 50 $cm^2$), and when the area of the single fuel cell increases further, this method faces the problem of insufficient heat dissipation capacity, and is hardly to ensure good temperature control. For fuel cell vehicles, for example, the effective reaction area of single fuel cell in fuel cell stack in Toyota Mirai first generation is about 260 $cm^2$, the area in Mirai second generation is about 270 $cm^2$, the area in Hyundai NEXO is about 280 $cm^2$, and the effective reaction area of single fuel cell in fuel cell stack products in domestic vehicle is about 300 $cm^2$.

For the above-mentioned development and testing of the large-area single fuel cell, the reliability and accuracy of the cooling fan control method are insufficient. Therefore, it is critical for product development and test inspection to propose a design method and device of a temperature regulating module for testing the large-area single fuel cell.

SUMMARY

The embodiment of the present disclosure provides a temperature control system for fuel cell and a temperature control method thereof, which can realize rapid temperature rise and good heat dissipation of a single fuel cell with large area, ensure accurate and reliable temperature control in a test process of a single fuel cell, greatly improve the accuracy of performance test of the single fuel cell with large area, and promote the improvement of research and development capability and detection capability of the fuel cell.

In a first aspect, it provides a temperature control system for fuel cell, comprising: a fuel cell under test, comprising two end plates disposed opposite each other, and the end plates having an area of at least a first preset value; at least two temperature regulating modules, respectively disposed on a surface of one side of the two end plates facing outside of the fuel cell under test, to achieve separate temperature control of the two end plates, corresponding to separate regulation of temperature of an anode and a cathode, capable of overcoming a temperature difference between the anode and the cathode of the fuel cell under test, and an area of a heat radiation surface of the temperature regulating module opposite the end plates is greater than or equal to a first preset proportion of the first preset value; at least two temperature detection modules, mounted to the cathode and anode of the fuel cell under test, for obtaining a measured temperature of the cathode and anode of the fuel cell under test; a control module, connected to the temperature detection module and connected to the temperature regulating module, for respectively controlling operating states of the two temperature regulating modules according to detection results of the two temperature detection modules, so as to regulate the temperature of the end plates of the fuel cell under test, in order to regulate the measured temperature of the cathode and anode to tend to a target temperature.

In a possible implementation of the first aspect, the temperature regulating module comprising a plate-shaped temperature regulating unit, the plate-shaped temperature regulating unit comprising a plurality of semiconductor chilling plates; the plate-shaped temperature regulating unit is provided opposite the end plate, and the plate-shaped temperature regulating unit has a plate-shaped heat radiation surface, an area of a heat radiation surface of the plate-shaped heat radiation surface opposite to the end plate is greater than or equal to a first preset proportion of the first preset value; the first preset proportion is greater than or equal to 70%.

In a possible implementation of the first aspect, in a plurality of semiconductor chilling plates of the plate-shaped temperature regulating unit, each of the semiconductor chilling plates is uniformly arranged on a side surface of the end plate facing the outside of the fuel cell under test, and disposed close to the end plate of the fuel cell under test, an area of a heat radiation surface opposite to the end plate is greater than or equal to a second preset value, and the respective semiconductor chilling plates are connected in parallel with each other, and connected to the control module, for adjusting the temperature of one side of the end plate of the fuel cell under test according to a measured temperature acquired by the control module.

In a possible implementation of the first aspect, the temperature regulating module further comprises: a liquid cooling temperature control unit, arranged outside a side surface of the plate-shaped temperature regulating unit away from the fuel cell under test, and provided with a liquid path and temperature-controllable liquid that can flow in the liquid path, for adjusting the temperature of a side of the end plate of the fuel cell under test according to a measured temperature acquired by the control module.

In a possible implementation of the first aspect, the liquid paths of the liquid cooling temperature control units are interconnected through conduits and connected to the same temperature-controllable coolant circulator, the coolant circulator regulates the liquid temperature in the liquid path for the liquid cooling temperature control unit, and provides the temperature-controllable liquid for the liquid path, and the liquid cooling temperature control unit covers at least 80% of the area of the plate-shaped heat radiation surface of the plate-shaped temperature regulating unit.

In a possible implementation of the first aspect, the liquid cooling temperature control unit comprises a plurality of liquid cooling blocks, the liquid cooling block at least comprises a liquid cooling inlet and a liquid cooling outlet, and among two adjacent liquid cooling blocks, a liquid cooling outlet of a previous liquid cooling block is connected to a liquid cooling inlet of a next liquid cooling block through a conduit, the temperature-controllable liquid can flow between the respective liquid cooling blocks along the conduit.

In a possible implementation of the first aspect, the conduit includes a U-shaped conduit to extend the liquid path of the temperature-controllable liquid, so as to enhance an ability to control temperature.

In a possible implementation of the first aspect, the temperature regulating module further comprises: a thermally conductive metal plate, arranged between the plate-shaped temperature regulating unit and the liquid cooling temperature control unit, covering at least 80% of an area of the plate-shaped heat radiation surface of the plate-shaped temperature regulating unit, for accelerating a heat conduction of the semiconductor chilling plate.

In a possible implementation of the first aspect, the temperature regulating module 202 further comprises: a thermally conductive film layer disposed between the thermally conductive metal plate and the plate-shaped temperature regulating unit, and/or, disposed between the thermally conductive metal plate and the liquid cooling temperature control unit.

In a possible implementation of the first aspect, the temperature detection module includes at least two thermocouples to be mounted to the cathode and anode of the fuel cell under test, respectively, to obtain the measured temperature of the cathode and anode.

In a possible implementation of the first aspect, the control module includes: a temperature controller, connected to the temperature detection module, and connected to the temperature regulating module, configured to acquire the measured temperature acquired by the temperature detection module, and respectively adjust the operation states of the two temperature regulating modules according to the magnitude relationship between the measured temperature and the target temperature, so as to adjust temperature of the cathode and the anode of the fuel cell under test to tend to the target temperature.

In a possible implementation of the first aspect, the first preset value is greater than or equal to 30 $cm^2$.

In a second aspect, embodiments of the present disclosure provides a temperature control method for a fuel cell, it uses the temperature control system for fuel cell, comprising:

providing a fuel cell under test, the fuel cell under test comprising two end plates disposed opposite each other, and the end plate having an area of at least a first preset value; obtaining measured temperature of the cathode and anode of the fuel cell under test; obtaining target temperature of the cathode and anode of the fuel cell under test; providing at least two temperature regulating modules, provided on surfaces of two end plates facing outside of the fuel cell under test respectively, and the area of the heat radiation surface of the temperature regulating module opposite the end plate is greater than or equal to a first preset proportion of the first preset value; according to the measured temperature as well as the target temperature, adjusting the temperature of surfaces of two end plates disposed oppositely in the fuel cell under test by the at least two temperature regulating modules, thereby adjusting the measured temperature of the cathode and anode of the fuel cell under test to tend to the target temperature.

In a possible implementation of the second aspect, according to the measured temperature as well as the target temperature, adjusting the temperature of surfaces of two end plates disposed oppositely in the fuel cell under test by the at least two temperature regulating modules, comprising: according to a magnitude relationship between the measured temperature and the target temperature, respectively providing an external temperature for surfaces of two oppositely arranged end plates of the fuel cell under test by the at least two temperature regulating modules, and changing an external temperature provided by the temperature regulating module for the end plates of the fuel cell under test by controlling an external temperature adjustment power of the temperature regulating module, so as to respectively adjust the temperatures of the surfaces of the two end plates, wherein when the measured temperature is greater than the target temperature, a temperature range of the external temperature is less than the measured temperature, and when the measured temperature is less than the target temperature, the temperature range of the external temperature is greater than the measured temperature.

In a possible implementation of the second aspect, when the at least two temperature regulating modules respectively provide the external temperature for the surfaces of two oppositely arranged end plates of the fuel cell under test, if the measured temperature changes reversely with time towards the target temperature, increasing or decreasing the external temperature adjusting power to increase or decrease the external temperature, so that the measured temperature changes positively toward the target temperature until the external temperature adjusting power reaches an extreme value within an adjustment range.

According to the temperature control system for fuel cell and the temperature control method thereof, at least two temperature regulating modules are respectively arranged on one side surface of two end plates facing the outside of a fuel cell under test so as to respectively control the temperature of the two end plates. And an area of a heat radiation surface of the temperature regulating module opposite to the end plate is greater than or equal to a first preset proportion of the first preset value, so that effective temperature control of a large-area fuel cell can be realized, rapid temperature rise and good heat dissipation of the large-area single fuel cell can be realized, accurate and reliable temperature control in a test process of a single fuel cell can be ensured, accuracy of performance test of the large-area single fuel cell can be greatly improved, and improvement of research and development capability and detection capability of the fuel cell can be promoted. It makes up for the shortage of reliability and accuracy when adopting the cooling fan control method for the test of large-area single fuel cell, and solves the problem that it is difficult to ensure a good temperature control effect due to the shortage of the cooling capacity.

REFERENCE NUMBER

201—control module; 202—temperature regulating module; 203—temperature detection module; 1—end plate; 2—gas inlet and outlet connectors; 3—power supply line of semiconductor chilling plate; 4—semiconductor chilling plate; 5—cooling copper plate; 6—screws; 7—liquid cooling temperature control unit; 8—screws for fixing the liquid cooling temperature control unit to the cooling copper plate; 9—pagoda connector between the liquid cooling temperature control unit and the hose; 10—hose; 11—coolant circulator; 12—temperature controller; 13—thermocouple; 14—thermally conductive silicone grease; 100—fuel cell under test.

DETAILED DESCRIPTION

Illustrative embodiments of the present disclosure include, but are not limited to, a temperature control system for fuel cell and a temperature control method thereof.

It is understood that, as used herein, the term "module" may refer to or include an disclosure-specific integrated circuit (ASIC), an electronic circuit, a processor (shared, dedicated, or grouped) and/or memory that executes one or more software or firmware programs, a combinational logic circuit, and/or other appropriate hardware components that provide the functions described, or may be part of such hardware components.

It will be understood that in embodiments of the present disclosure, a control module may be a microprocessor, a digital signal processor, a microcontroller, etc., and/or any combination thereof.

Embodiments of the present disclosure will be described in further detail below in combination with the accompanying drawings.

It will be understood that the temperature control system for fuel cell and the temperature control method thereof provided in the present disclosure can be implemented in various fuel cells, which include, but are not limited to, proton exchange membrane fuel cells, direct methanol fuel cells (DMFC), and the like.

The following is an example of a temperature control system for fuel cell to illustrate the temperature control system for the fuel cell disclosed in the present disclosure.

Figure 1:
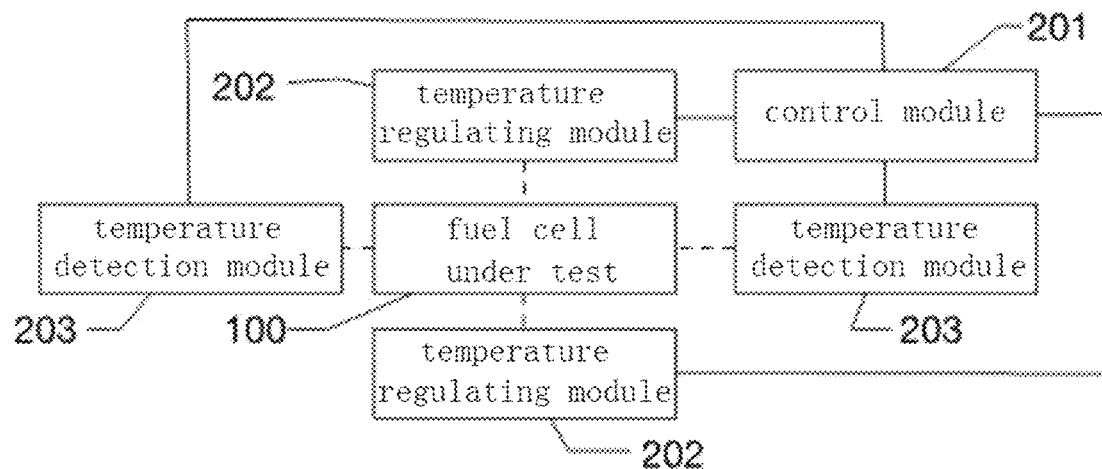
FIG. 1 is a schematic diagram of a temperature control system for fuel cell described in the present disclosure.

FIG. 1 illustrates a schematic diagram of a temperature control system for fuel cell according to some embodiments of the present disclosure. Specifically, as shown in FIG. 1, the temperature control system for fuel cell comprises: a fuel cell under test 100 comprising two end plates arranged opposite each other, and the end plate has an area of at least a first preset value; at least two temperature regulating modules 202, each arranged on a surface of two end plates facing outside of the fuel cell under test 100, to achieve separate temperature control of two end plates, and an area of a heat radiation surface of the temperature regulating module 202 opposite to the end plate is greater than or equal to a first preset proportion of the first preset value; at least two temperature detection modules 203, installed to a cathode and an anode of the fuel cell under test 100, respectively, for obtaining measured temperature of the cathode and anode of the fuel cell under test; a control module 201, connected to the temperature detection modules 203 and connected to the temperature regulating module 202 for controlling operating state of each of the two temperature regulating modules 202 according to detection results of the two temperature detection modules 203, so as to regulate and control the temperature of the end plate of the fuel cell under test 100, in order to control the measured temperature of the cathode and the anode to tend to the target temperature.

Since there are two temperature regulating modules 202, the temperatures of the two end plates are controlled respectively. Accordingly the temperatures of the anode and the cathode are adjusted separately, the temperature difference between the anode and the cathode of the fuel cell under test 100 can be overcome, and the temperature of the whole fuel cell under test 100 can be uniform as much as possible.

In addition, because the area of the end plate of the fuel cell under test 100 is at least a first preset value, and the area of the heat radiation surface of the temperature regulating module 202 opposite to the end plate is greater than or equal to a first preset proportion of the first preset value, the temperature control system for fuel cell can be used for temperature control of a large volume fuel cell having a large-area end plate, and has a better temperature control effect on the fuel cell. The temperature control efficiency of the temperature regulating module 202 can be effectively controlled by setting the size of the first preset proportion.

In some embodiments, the first preset proportion is greater than or equal to 70%. Therefore, at least 70% of the area of the end plate is opposite to the front surface of the heat radiation surface of the temperature regulating module 202, and the temperature regulating module 202 can realize rapid temperature regulating of the end plate. In addition, even if the area of the end plate is large, the temperature regulating module 202 can also have better temperature regulating efficiency for the end plate.

In other embodiments, the size of the first preset proportion may also be set as required. The larger the first preset proportion is, the better the temperature regulating effect is, and the better the cooling of the large-area single fuel cell can be performed. The smaller the first preset proportion, the lower the preparation cost of the temperature regulating module 202 may be.

In some embodiments, the temperature regulating module 202 comprises: a plate-shaped temperature regulating unit, disposed opposite to the end plate, and the plate-shaped temperature regulating unit has a plate-shaped heat radiation surface, and an area of the heat radiation surface of the plate-shaped heat radiation surface opposite to the end plate is greater than or equal to a first preset proportion of the first preset value; and/or, the first preset proportion is greater than or equal to 70%.

The heat radiation surface is preferably arranged on a plate surface of the plate-shaped temperature regulating unit, and the plate surface is opposite to the end plate, so as to have a large temperature regulating efficiency. Actually, in other embodiments, the temperature regulating module 202 may regulate the temperature of the end plate by a temperature regulating unit with other shapes.

In some embodiments, the plate-shaped temperature regulating unit comprises: a plurality of semiconductor chilling plates. Each of the semiconductor chilling plates is uniformly arranged on a side surface of the end plate facing outside of the fuel cell under test 100, and disposed close to the end plate of the fuel cell under test 100. An area of a heat radiation surface opposite to the end plate is greater than or equal to a second preset value. The respective semiconductor chilling plates are connected in parallel with each other, and connected to the control module 201, for adjusting the temperature of a side of the end plate of the fuel cell under test 100 according to the measured temperature acquired by the control module 201.

The semiconductor chilling plate has functions of cooling and heating, and cooling or heating state of the semiconductor chilling plate can be changed by controlling a direction of a current flowing through the semiconductor chilling plate. Therefore, the semiconductor chilling plate can realize the operation of raising or lowering the temperature of the end plate.

The semiconductor chilling plate has a plate surface, and heat radiation is performed through the plate surface. And the plate surface is directly opposite to the end plate. A plurality of the semiconductor chilling plates are sequentially arranged on one side of the end plate and placed side by side. A projected area on the end plate is greater than or equal to a first preset proportion of the area of the end plate.

In some embodiments, the plate-shaped temperature regulating unit may also use another plate-shaped thermostat to regulate the temperature instead of the semiconductor chilling plate. It should be noted that no matter which plate-shaped thermostat is used to prepare the plate-shaped temperature regulating unit, the plate-shaped thermostat preferably has the function of cooling and heating, so as to increase or decrease the temperature of the end plate.

Therefore, in these embodiments, the fuel cell under test 100 may always operate at a preferred temperature of the end plate. Specifically, if the temperature of the end plate is relatively low and a power generation efficiency is relatively poor at this time, the temperature of the end plate can be adjusted by the plate-shaped temperature regulating unit to increase, so as to increase the power generation efficiency of the fuel cell. If the temperature of the end plate is relatively high, the power generation efficiency is also poor at this time, and combustion, explosion and the like of the fuel cell may also be caused. Therefore, the temperature of the end plate may also be adjusted by the plate-shaped temperature regulating unit to reduce, thereby reducing the probability of combustion, explosion or gas expansion of the fuel cell and improving the power generation efficiency.

In some embodiments, the temperature regulating module 202 further comprises: a thermally conductive film layer disposed between the plate-shaped temperature regulating unit and the end plate. The thermally conductive film layer comprises a thermally conductive silicone grease, or other material layer with better thermally conductive efficiency, so that the end plate and the plate-shaped temperature regulating unit can have better heat transfer efficiency even if there is a gap therebetween, and help to improve the temperature control efficiency.

In some embodiments, the temperature regulating module 202 further comprises: a liquid cooling temperature control unit, arranged outside the side surface of the plate-shaped temperature regulating unit away from the fuel cell under test 100, and provided with a liquid path and temperature-controllable liquid that can flow in the liquid path, for adjusting the temperature of a side of the end plate of the fuel cell under test 100 according to the measured temperature acquired by the control module 201.

The number of the temperature regulating modules 202 is two, and the liquid paths of the liquid cooling temperature control units of the two temperature regulating modules 202 are interconnected through conduits and connected to the same temperature-controllable coolant circulator. The coolant circulator regulates the liquid temperature in the liquid path for the liquid cooling temperature control unit, and provides the temperature-controllable liquid for the liquid path. The liquid cooling temperature control unit covers at least 80% of the area of the plate-shaped heat radiation surface of the plate-shaped temperature regulating unit, so as to have sufficient temperature control efficiency.

The liquid cooling temperature control unit comprises a plurality of liquid cooling blocks. The liquid cooling block at least comprises a liquid cooling inlet and a liquid cooling outlet. And among two adjacent liquid cooling blocks, a liquid cooling outlet of a previous liquid cooling block is connected to a liquid cooling inlet of a next liquid cooling block through a conduit. The temperature-controllable liquid can flow between the respective liquid cooling blocks along the conduit.

The plurality of liquid cooling blocks are connected with each other through the conduit, so that recycling of temperature-controllable liquid can be realized. There is no need to configure a separate coolant circulator for each liquid cooling block and a separate recyclable liquid path, which helps to reduce the cost of the temperature regulating module 202.

In some embodiments, the conduit includes a U-shaped conduit that may extend the liquid path of the temperature-controllable liquid such that the temperature-controllable liquid can have more time to cool when flowing from one liquid cooling block to another liquid cooling block, thereby enhancing the cooling capacity of the liquid cooling temperature control unit.

In some embodiments, the temperature regulating module 202 further comprises: a thermally conductive film layer arranged between the liquid cooling temperature control unit and the plate-shaped temperature regulating unit. The thermally conductive film layer comprises the thermally conductive silicone grease, which can reduce the influence of the gap between the liquid cooling temperature control unit and the plate-shaped temperature regulating unit on the temperature regulating efficiency.

In some embodiments, the temperature regulating module 202 further comprises: a thermally conductive metal plate, arranged between the plate-shaped temperature regulating unit and the liquid cooling temperature control unit, covering at least 80% of an area of the plate-shaped heat radiation surface of the plate-shaped temperature regulating unit, for accelerating the heat conduction of the semiconductor chilling plate.

In some embodiments, the thermally conductive film layer is formed between the thermally conductive metal plate and the plate-shaped temperature regulating unit, and between the thermally conductive metal plate and the liquid cooling temperature control unit. The thermally conductive film layer comprises thermally conductive silicone grease or other material layer with better thermal conductivity, which can reduce the influence of the gap between the thermally conductive metal plate and the plate-shaped temperature regulating unit on the temperature regulating efficiency.

In some embodiments, the thermally conductive metal plate comprises at least one of a thermally conductive copper plate, a thermally conductive aluminum plate, or a thermally conductive steel plate and the like. A person skilled in the art may select a specific material layer of the thermally conductive metal plate as required.

In some embodiments, the temperature regulating module 202 further comprises: a thermally conductive film layer disposed between the thermally conductive metal plate and the liquid cooling temperature control unit.

In some embodiments, the temperature detection module 203 includes at least two thermocouples to be mounted to the cathode and anode of the fuel cell under test 100, respectively, to obtain measured temperature of the cathode and anode.

In fact, the temperature detection module 203 may also be a common temperature detection device such as an infrared sensor, and a person skilled in the art may make corresponding selection as required.

In some embodiments, the control module 201 includes: a temperature controller, connected to the temperature detection module 203, and connected to the temperature regulating module 202, configured to acquire the measured temperature acquired by the temperature detection module 203, and respectively adjust the operating states of the two temperature regulating modules 202 according to the magnitude relationship between the measured temperature and the target temperature, so as to adjust the temperature of the cathode and the anode of the fuel cell under test 100 to tend to the target temperature.

In some embodiments, the first preset value is greater than or equal to 30 cm$^2$, so the area of the end plate of the fuel cell is relatively large. The temperature control system can be used for a single fuel cell having an end plate with large area, and has a better temperature controlling effect for the single fuel cell having an end plate with large area.

Figure 2:
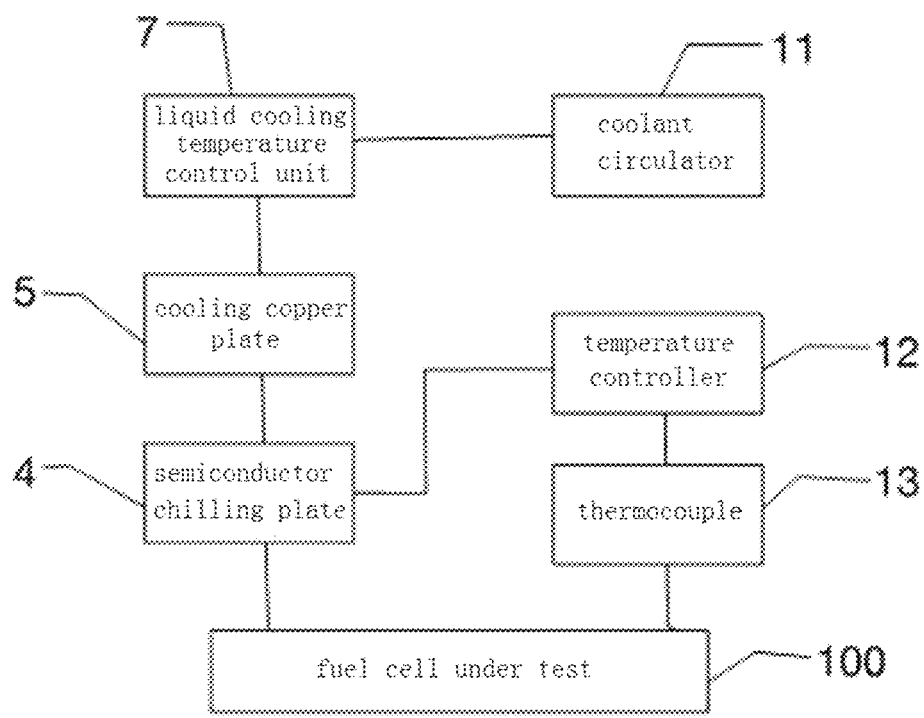
FIG. 2 is a schematic diagram of the structure of a temperature control system for fuel cell as described in the present disclosure.

Referring to FIG. 2, a schematic diagram of a structure of the temperature control system for fuel cell described in one embodiment is shown.

In this embodiment, the temperature control system for fuel cell comprises: a fuel cell under test 100, a semiconductor chilling plate 4, a cooling copper plate 5, a liquid cooling temperature control unit 7, a coolant circulator 11, a temperature controller 12 and a thermocouple 13. The fuel cell under test 100 is provided with a gas inlet and outlet 2 on the surface of the end plate for supplying gas in and out. Because there is a temperature difference between the anode end plate 1 and the cathode end plate 1 inside the fuel cell under test 100, in order to improve the temperature consistency inside the fuel cell under test 100, the temperature control modules 201 outside the anode end plate 1 and outside the cathode end plate 1 need to be separately regulated.

Figure 3:
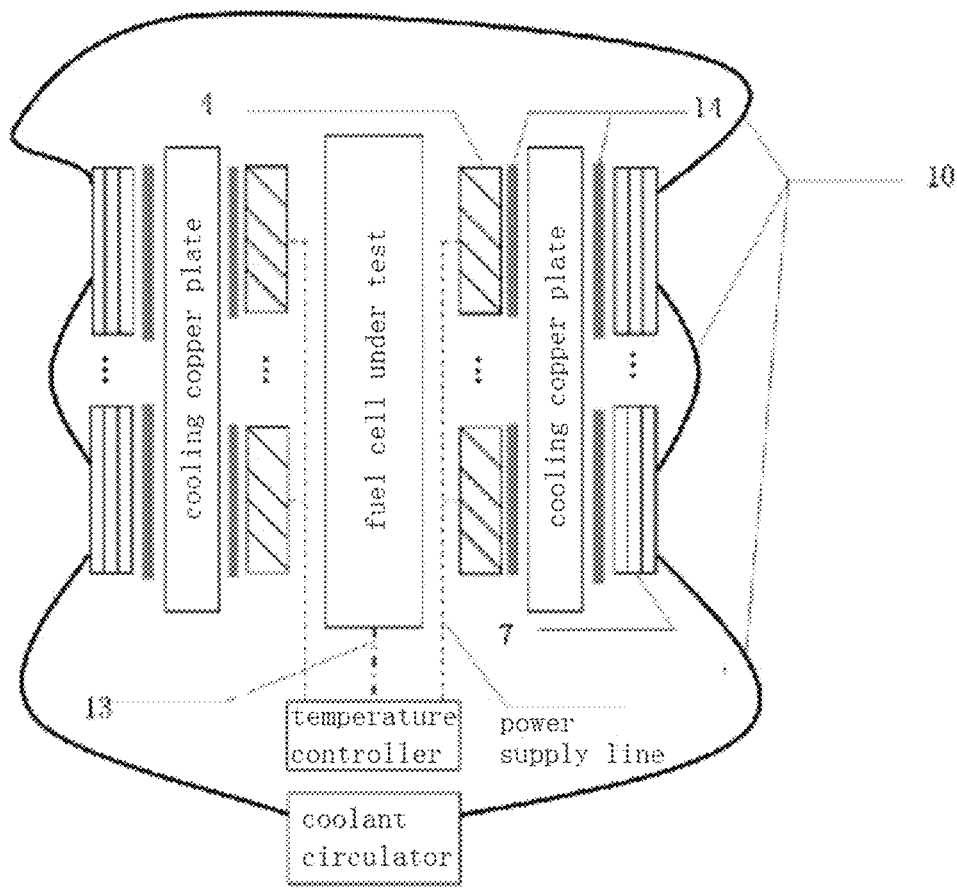
FIG. 3 is a schematic diagram of the physical connection relationship of a temperature control system for fuel cell as described in the present disclosure.

FIG. 3 shows a schematic diagram of a physical connection relationship of a temperature control system for fuel cell according to some embodiments of the present disclosure. Specifically, as shown in FIG. 3, the end plate 1 of the fuel cell under test 100 is disposed adjacent to the semiconductor chilling plate 4. The cooling copper plate 5 is disposed between the semiconductor chilling plate 4 and the liquid cooling temperature control unit 7. A thermally conductive silicone grease 14 is formed between the cooling copper plate 5 and the semiconductor chilling plate 4, and between the cooling copper plate 5 and the liquid cooling temperature control unit 7, and is used for bonding the cooling copper plate 5, the liquid cooling temperature control unit 7, and the semiconductor chilling plate 4, and plays a certain role in enhancing the thermally conductive effect.

In the embodiment shown in FIG. 3, thermally conductive silicone grease 14 is applied to a contact surface between each semiconductor chilling plate 4 and the end plate 1 to achieve a sufficient thermally conductive effect, and the effect of saving the thermally conductive silicone grease 14 is also achieved. In fact, in other embodiments, the thermally conductive silicone grease 14 may be applied on the entire surface of the end plate 1, which is not limited by the applying rule shown in the figure above.

The number of required semiconductor chilling plates 4 may be determined according to the size of the end plate 1 of the fuel cell under test 100.

When fixing the semiconductor chilling plate 4, it is necessary to make the semiconductor chilling plate 4 be stressed evenly to avoid excessive pressing so as to avoid installation damage. When a plurality of semiconductor chilling plates 4 are provided, the respective semiconductor chilling plates 4 are connected according to the relationship of the parallel circuit. The power supply red lines are screwed together, the power supply black lines are screwed together, and are respectively connected with a group of power supply harnesses of the temperature controller 12. The end plate 1 on the other side of the fuel cell under test 100 is bonded to the cold ends of the other four semiconductor chilling plates 4 in the same manner. The other four semiconductor chilling plates 4 are connected according to the relationship of parallel circuits. The power supply red lines are screwed together, and the power supply black lines are screwed together, and are respectively connected with the other group of power supply harness of the temperature controller 12.

Figure 4:
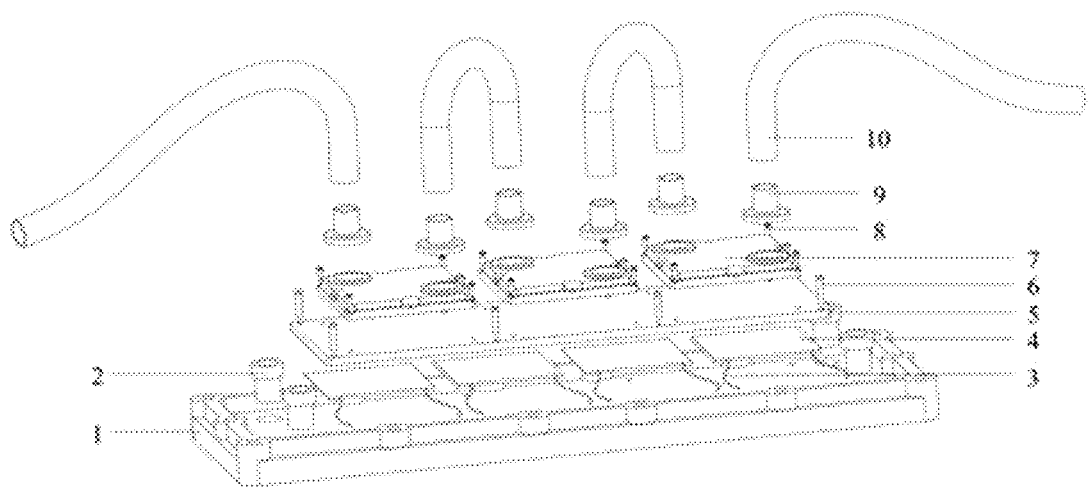
FIG. 4 is a schematic diagram of the assembly of a single side temperature regulating module of a temperature control system for fuel cell as described in the present disclosure.
Figure 5:
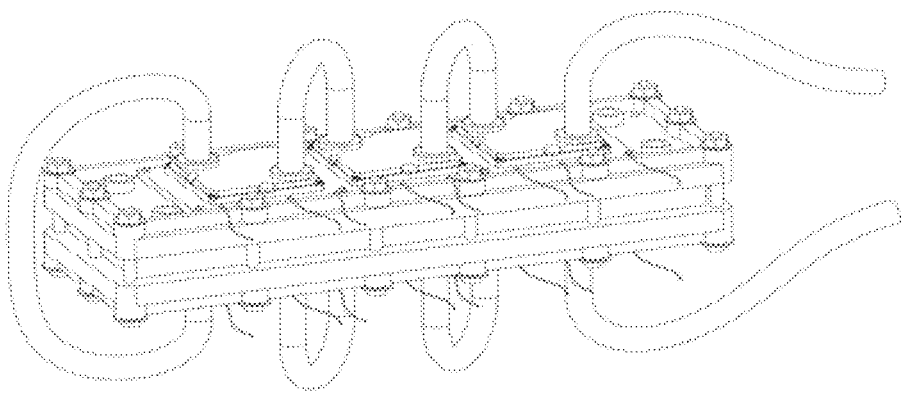
FIG. 5 is a schematic diagram of the overall assembly of a temperature control system for fuel cell as described in this disclosure.

FIG. 4 and FIG. 5 show a schematic assembly diagram of a single-side temperature regulating module 202 of a temperature control system for fuel cell and an overall assembly diagram of a temperature control system for fuel cell, respectively according to some embodiments of the present disclosure.

In the embodiments shown in FIG. 4 and FIG. 5, the effective reaction area of the fuel cell under test 100 is 18.0 cm×6.0 cm=108.0 cm$^2$. The area of the end plate 1 of the fuel cell under test 100 is 28.0 cm×10.0 cm=280.0 cm$^2$. The area that can be used for installing the temperature regulating module 202 is about 21.0 cm×7.0 cm=147.0 cm$^2$ after the area occupied by the mounting bolt, the gas inlet of the single fuel cell 100, and the gas outlet of the single fuel cell 100 is removed. The area of the semiconductor chilling plate is 4.0 cm×4.0 cm=16.0 cm$^2$.

Determining the number of required semiconductor chilling plates 4 to be 4 according to the size of the end plate 1 of the fuel cell under test 100. They are arranged in sequence on the surface of the end plate 1 of the fuel cell under test 100.

The cooling copper plate 5 has an area of 20.5 cm×6.3 cm=129.2 cm$^2$ and a thickness of 0.5 cm. The cooling copper plate 5 is mounted to the surface of the end plate 1 of the fuel cell under test 100 by means of screws 6, thus serving to fix the semiconductor chilling plates 4.

The surface of the end plate 1 of the fuel cell under test 100 is provided with screw holes, and the surface of the cooling copper plate 5 is provided with corresponding screw holes. By reasonably arranging the position of the cooling copper plate 5, it is ensured that the screw holes on the cooling copper plate 5 can be aligned with the screw holes on the surface of the end plate 1 of the fuel cell under test 100, so as to facilitate direct connection by screws 6.

In the embodiment shown in FIGS. 4 and 5, the aperture of the screw hole is 4 cm. The size of the screw 6 is kept adapted to the aperture of the screw hole. There are a total of eight screws 6 between the cooling copper plate 5 and the end plate 1 to ensure a good fixation between cooling copper plate 5 and end plate 1. The screw holes are distributed on the upper and lower long sides of the cooling copper plate 5, and four screw holes are respectively machined on the upper and lower long sides of the cooling copper plate 5.

The remaining area of the cooling copper plate 5 is machined with twelve threaded holes with a diameter of 3.0 cm for the connection of the cooling copper plate 5 to the liquid cooling temperature control unit 7 by screws 8.

The cooling copper plate 5 is connected to the liquid cooling temperature control unit 7 by the screws 8. Each liquid cooling temperature control unit 7 is machined with four mounting holes with a diameter of 3.0 cm. The position of the mounting holes coincides with the corresponding fixing threaded holes in the cooling copper plate 5, and the dimensions are suitable for each other.

The liquid cooling temperature control unit 7 is connected to the cooling copper plate 5 by the screws 8. The required number of liquid cooling temperature control units 7 is determined according to the size of the cooling copper plate 5. The area of the liquid cooling temperature control units 7 is 5.2 cm×5.2 cm=27.0 cm$^2$. The required number of liquid cooling temperature control units 7 can be determined as 3 in combination with the aforementioned size of the cooling copper plate 5.

The liquid cooling temperature control units 7 are connected to each other by a hose 10, where the temperature-controllable liquid outlet of the previous liquid cooling temperature control unit 7 is connected to the temperature-controllable liquid inlet of the next liquid cooling temperature control unit 7. The liquid cooling temperature control unit 7 and the hose 10 are connected by a pagoda connector 9. One end of the pagoda connector 9 is connected to the temperature-controlled liquid outlet and the temperature-controlled liquid inlet of the liquid cooling temperature control unit 7 by threads, and the other end of the pagoda connector 9 is snapped together with the hose 10.

Thermally conductive silicone grease 14 is applied to the contact surface of each liquid cooling temperature control unit 7 and the cooling copper plate 5 to enhance thermal conductivity.

The liquid cooling temperature control unit 7 is connected to the coolant circulator 11 by a hose 10. The temperature-controllable liquid flows out from the outlet of the coolant circulator 11 and flows back to the inlet of the coolant circulator 11 after flowing through all the liquid cooling temperature control units 7 in turn. Moreover, the temperature-controlled liquid outlet of the previous liquid cooling temperature control unit 7 is connected to the temperature-controlled liquid inlet of the next liquid cooling temperature control unit 7 to form a complete flow path. After the connection is completed, the hose 10 has a "U" shape.

In some embodiments, the liquid cooling temperature control unit 7 located on the outside of the left end plate 1 is connected to the liquid cooling temperature control unit 7 on the outside of the right end plate 1 outside the end plate 1 on the other side of the fuel cell under test 100 by a hose 10. That is, the temperature-controllable liquid flows through all the liquid cooling temperature control units 7 in the temperature regulating module 202 outside the end plate 1 on this side and then flows into the liquid cooling temperature control unit 7 outside the end plate 1 on the other side.

In some embodiments, flow rate of the temperature-controllable liquid in the coolant circulator 11 is 8 L min$^{-1}$ and the control temperature range of the temperature-controllable liquid is 0-80° C.

A measuring end of the thermocouple 13 is inserted into the interior of the fuel cell under test 100 to measure the real-time temperature.

In some embodiments, the number of required thermocouples 13 is two, where the measuring end of the first thermocouple 13 is inserted inside the anode of the fuel cell under test 100 to measure the real-time temperature of the anode, and the measuring end of the second thermocouple 13 is inserted inside the cathode of the fuel cell under test 100 to measure the real-time temperature of the cathode. The first thermocouple 13 and the second thermocouple 13 are connected to the temperature feedback harness of the temperature controller 12, i.e., there are two different fuel cell temperature signals fed back to the temperature controller 12 respectively. The thermocouple 13 is selected as K type thermocouple 13.

The thermocouple 13 is inserted inside the fuel cell under test 100 to measure the real-time temperature and adjust the operating state of the temperature regulating module 202 in real time based on comparison with the operating temperature of the single fuel cell 100 as specified in the test conditions, ensuring the timeliness and accuracy of the operating temperature control of the single fuel cell 100.

The temperature controller 12 has a total of 2 sets of power supply harnesses, one set of which is connected to the four semiconductor chilling plates 4 on the outside of the anode end plate 1 of the fuel cell under test 100, and the other set of which is connected to the four semiconductor chilling plates 4 on the outside of the cathode terminal plate 1 of the fuel cell under test 100. Specifically, the power supply harness of the temperature controller 12 is connected to a power supply line 3 of the semiconductor chilling plate 4.

The temperature controller 12 can independently adjust current and voltage of the two sets of power supply harnesses, so as to independently adjust the operating state of the semiconductor chilling plates 4 on the outside of the anode terminal plate 1 and the outside of the cathode terminal plate 1, and complete the regulation of the operating temperature of the anode and cathode inside the fuel cell under test 100.

In some embodiments, the temperature controller 12 has a temperature control accuracy of ±0.2° C. and a temperature control range of minus 40-100° C.

The integrated solution of the semiconductor chilling plates 4, the cooling copper plate 5, the liquid cooling temperature control unit 7, the coolant circulator 11, the temperature controller 12, the thermocouple 13 and other equipment can realize fast temperature rise and good heat dissipation of the single fuel cell 100 with a large area, ensure accurate and reliable temperature control during the test of single fuel cell 100, and greatly improve the accuracy of performance testing of the single fuel cell 100 with a large area.

The following is an example of the temperature control method of the temperature control system for fuel cell disclosed in this disclosure.

Figure 6:
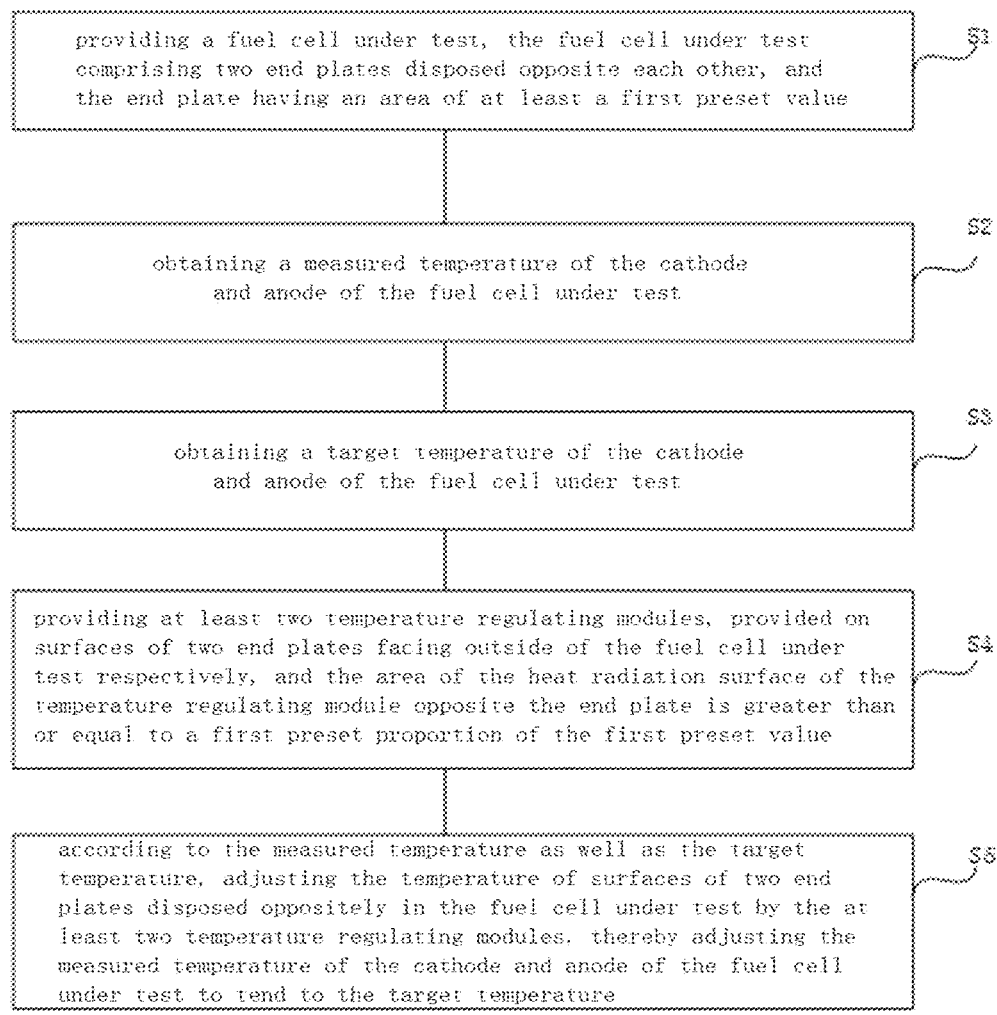
FIG. 6 is a schematic diagram of the step flow of a temperature control method for a fuel cell as described in this disclosure.

FIG. 6 illustrates a schematic flow diagram of the steps of a temperature control method for a fuel cell according to some embodiments of the present disclosure. The temperature control method comprises the steps of:

Step S1: providing a fuel cell under test 100, the fuel cell under test 100 comprising two end plates disposed opposite each other, and the end plate having an area of at least a first preset value. Step S2: obtaining the measured temperature of the cathode and anode of the fuel cell under test 100. Step S3: obtaining the target temperature of the cathode and anode of the fuel cell under test 100. Step S4: providing at least two temperature regulating modules 202, disposed on the surfaces of two end plates facing the outside of the fuel cell under test 100 respectively, and the area of the heat radiation surface of the temperature regulating modules 202 opposite the end plate is greater than or equal to a first preset proportion of the first preset value according to the measured temperature and target temperature. Step S5: according to the measured temperature as well as the target temperature, adjusting the temperature of surfaces of two end plates disposed oppositely in the fuel cell under test 100 by the at least two temperature regulating modules 202, thereby adjusting the measured temperature of the cathode and anode of the fuel cell under test 100 to tend to the target temperature.

Combining the parameters of the aforementioned temperature control system for fuel cell to obtain the following examples:

Place the fuel cell under test 100 with an effective reaction area of 108.0 cm$^2$ on a fuel cell test bench, connect an reactant supply interface of the test bench with a load interface, to ensure that a gas tightness test of the fuel cell under test 100 is qualified.

Set and adjust parameters of the test bench according to a stoichiometric ratio of cathode and anode intake gas 2.0 and 2.0, cathode and anode intake gas temperature 80° C. and 80° C., cathode and anode intake gas relative humidity 100% and 100%, cathode and anode intake gas pressure 1.5 atm and 1.5 atm, so that an intake gas flow, intake gas temperature, intake gas humidity and intake gas pressure are within a specified parameter ranges.

Turn on the coolant circulator and the temperature controller, set the target temperature Ttarget of the temperature controller according to the operating temperature of the single fuel cell specified in the test conditions, and set control temperature of the temperature-controllable liquid in the coolant circulator as Tcool. According to the operating temperature of the single fuel cell under test of 80° C., the target temperature Ttarget of the temperature controller is set to be 80° C., and control temperature Tcool of the temperature-controllable liquid in the coolant circulator is set to be 10° C.

Start a test according to the test conditions, start a performance test of the fuel cell under test, and read a real-time temperature Treal that the thermocouple inserted into the fuel cell under test feeds back to the temperature controller, including a real-time temperature Treal_1 that a first thermocouple feeds back to the temperature controller and read by the temperature controller and a real-time temperature Treal_2 that a second thermocouple feeds back to the temperature controller and read by the temperature controller.

It compares the target temperature Ttarget of the temperature controller with the real-time temperature Treal of a single fuel cell, and if Ttarget is greater than Treal, it automatically increases heating power of the semiconductor chilling plate by the temperature controller. It compares the target temperature 80° C. of the temperature controller with the real-time temperature Treal_1 that the first thermocouple feeds back to the temperature controller, and if Treal_1 is less than 80° C., the heating power of the four semiconductor chilling plates outside the anode of the fuel cell under test is automatically increased by the temperature controller; if Treal_1 is greater than 80° C., cooling power of the four semiconductor chilling plates outside the anode of the fuel cell under test is automatically increased by the temperature controller.

It compares the target temperature 80° C. of the temperature controller with the real-time temperature Treal_2 that the second thermocouple feeds back to the temperature controller. If Treal_2 is less than 80° C., the heating power of the four semiconductor chilling plates outside the cathode of the fuel cell under test is automatically increased by the temperature controller. If Treal_2 is greater than 80° C., the cooling power of the four semiconductor chilling plates outside the cathode terminal of the fuel cell under test is automatically increased by the temperature controller.

If Treal is still greater than Ttarget when the cooling power of semiconductor chilling plate reaches the maximum, the control temperature Tcool of the temperature-controllable liquid of the coolant circulator is reduced to further increase the cooling power of the semiconductor chilling plate; if Treal_1 and Treal_2 are still greater than 80° C. under the above implementation steps, the control temperature Tcool of the temperature-controllable liquid of the coolant circulator is reduced to 5° C., thereby further enhancing the cooling power of the semiconductor chilling plate.

Repeat the above steps until the difference between the target temperature of 80° C. of the temperature controller and the real-time temperature Treal_1 and Treal_2 that the thermocouple feeds back to the temperature controller do not exceed a set temperature difference value Tdiff.

It will be understood that the structure illustrated in the embodiments of the present disclosure does not constitute a specific limitation on the temperature control system for fuel cell and the temperature control method. In other embodiments of the present disclosure, more or fewer components than illustrated may be included, or certain components may be combined, or certain components may be disassembled, or different arrangements of components may be used. The illustrated components may be implemented as hardware, software, or a combination of software and hardware.

Embodiments of the mechanisms disclosed in the present disclosure may be implemented in hardware, software, firmware, or a combination of these implementation methods. Embodiments of the present disclosure may be implemented as a computer program or program code executing on a programmable system comprising at least one processor, a storage system (including volatile and non-volatile memory and/or storage elements), at least one input device, and at least one output device.

Program code may be applied to the input instructions to perform each of the functions described in this disclosure and to generate output information. The output information may be applied to one or more output devices in a known manner.

The program code can be implemented in a high-level procedural language or an object-oriented programming language to communicate with the processing system. The program code can also be implemented in assembly language or machine language when desired. In fact, the mechanisms described in this disclosure are not limited to the scope of any particular programming language. In either case, the language may be a compiled language or an interpreted language.

In some embodiments, the disclosed embodiments may be implemented in hardware, firmware, software, or any combination thereof. The disclosed embodiments may also be implemented as instructions carried by or stored on one or more temporary or non-transitory machine-readable (e.g., computer-readable) storage media, which may be read and executed by one or more processors. For example, the instructions may be distributed over a network or through other computer-readable media. Thus, a machine-readable medium may include any mechanism for storing or transmitting information in a machine-readable (e.g., computer) form, including, but not limited to, floppy disks, optical disks, CD-ROMs, magnetic disks, read-only memories (ROMs), random access memories (RAMs), erasable programmable read-only memories (EPROMs), electrically erasable programmable read-only Readable Memory (EEPROM), magnetic or optical cards, flash memory, or tangible machine-readable memory used to transmit information (e.g., carrier waves, infrared signals digital signals, etc.) by means of electrical, optical, acoustic, or other forms of propagation signals using the Internet. Thus, machine-readable media includes any type of machine-readable media suitable for storing or transmitting electronic instructions or information in a machine-readable form (e.g., a computer).

In the accompanying drawings, some structural or methodological features may be shown in a particular arrangement and/or order. However, it should be understood that such a particular arrangement and/or order may not be required. Rather, in some embodiments, these features may be arranged in a manner and/or order different from that shown in the illustrative accompanying drawings. Further, the inclusion of structural or method features in a particular figure does not imply that such features are required in all embodiments, and in some embodiments, such features may be excluded or may be combined with other features.

It should be noted that each unit/module mentioned in each device embodiment of the present application is a logical unit/module. Physically, a logical unit/module may be a physical unit/module, may be a part of a physical unit/module, or may be implemented in a combination of a plurality of physical units/modules. The physical implementation of these logical units/modules is not most important. The combination of functions implemented by these logical units/modules is the key to solving the technical problem proposed in the present application. Furthermore, in order to highlight the inventive part of the present application, the above-mentioned device embodiments of the present application do not introduce units/modules which are not closely related to solving the technical problems set forth in the present application, which does not indicate that there are no other units/modules in the above-mentioned device embodiments.

It is to be noted that in the examples and description of this patent, relational terms such as first and second etc. are used solely to distinguish one entity or operation from another entity or operation, and do not necessarily require or imply any such actual relationship or order between such entities or operations. Moreover, the terms "comprises," "comprising," or any other variation thereof, are intended to cover a non-exclusive inclusion, such that a process, method, article, or apparatus that comprises a list of elements includes not only those elements but also other elements not expressly listed, or also includes elements inherent to such process, method, article, or apparatus. Without further limitation, an element defined by the statement "comprising one" does not rule out there are additional identical elements in the process, method, article, or apparatus that includes the element.

Although this disclosure has been illustrated and described by reference to certain preferred embodiments of this disclosure, it should be understood by those of ordinary skill in the art that various changes may be made thereto in form and detail without departing from the spirit and scope of this disclosure.

The invention claimed is:

1. A temperature control system for fuel cell, comprising:
a fuel cell under test, comprising two end plates disposed opposite each other, and the end plates having an area of at least a first preset value;
at least two temperature regulating modules, respectively disposed on a surface of one side of the two end plates facing outside of the fuel cell under test, to achieve separate temperature control of the two end plates, corresponding to separate regulation of temperature of an anode and a cathode, capable of overcoming a temperature difference between the anode and the cathode of the fuel cell under test, and an area of a heat radiation surface of the temperature regulating module opposite the end plates is greater than or equal to a first preset proportion of the first preset value;
at least two temperature detection modules, mounted to the cathode and anode of the fuel cell under test, for obtaining a measured temperature of the cathode and anode of the fuel cell under test;
a control module, connected to the temperature detection module and connected to the temperature regulating module, for respectively controlling operating states of the two temperature regulating modules according to detection results of the two temperature detection modules, so as to regulate the temperature of the end plates of the fuel cell under test, in order to regulate the measured temperature of the cathode and anode to tend to a target temperature;
the temperature regulating module comprising a plate-shaped temperature regulating unit, the plate-shaped temperature regulating unit comprising a plurality of semiconductor chilling plates;
the plate-shaped temperature regulating unit is provided opposite the end plate, and the plate-shaped temperature regulating unit has a plate-shaped heat radiation surface, an area of a heat radiation surface of the plate-shaped heat radiation surface opposite to the end plate is greater than or equal to a first preset proportion of the first preset value;
the first preset proportion is greater than or equal to 70%;
in a plurality of semiconductor chilling plates of the plate-shaped temperature regulating unit, each of the semiconductor chilling plates is uniformly arranged on a side surface of the end plate facing the outside of the fuel cell under test, and disposed close to the end plate of the fuel cell under test, an area of a heat radiation surface opposite to the end plate is greater than or equal to a second preset value, and the respective semiconductor chilling plates are connected in parallel with each other, and connected to the control module, for adjusting the temperature of one side of the end plate of the fuel cell under test according to a measured temperature acquired by the control module;

the temperature regulating module further comprises: a liquid cooling temperature control unit, arranged outside a side surface of the plate-shaped temperature regulating unit away from the fuel cell under test, and provided with a liquid path and temperature-controllable liquid that can flow in the liquid path, for adjusting the temperature of a side of the end plate of the fuel cell under test according to a measured temperature acquired by the control module;

the liquid paths of the liquid cooling temperature control units are interconnected through conduits and connected to the same temperature-controllable coolant circulator, the coolant circulator regulates the liquid temperature in the liquid path for the liquid cooling temperature control unit, and provides the temperature-controllable liquid for the liquid path, and the liquid cooling temperature control unit covers at least 80% of the area of the plate-shaped heat radiation surface of the plate-shaped temperature regulating unit;

the liquid cooling temperature control unit comprises a plurality of liquid cooling blocks, the liquid cooling block at least comprises a liquid cooling inlet and a liquid cooling outlet, and among two adjacent liquid cooling blocks, a liquid cooling outlet of a previous liquid cooling block is connected to a liquid cooling inlet of a next liquid cooling block through a conduit, the temperature-controllable liquid can flow between the respective liquid cooling blocks along the conduit;

the conduit includes a U-shaped conduit to extend the liquid path of the temperature-controllable liquid, so as to enhance an ability to control temperature;

the temperature regulating module further comprises: a thermally conductive metal plate, arranged between the plate-shaped temperature regulating unit and the liquid cooling temperature control unit, covering at least 80% of an area of the plate-shaped heat radiation surface of the plate-shaped temperature regulating unit, for accelerating a heat conduction of the semiconductor chilling plate;

the temperature regulating module further comprises: a thermally conductive film layer disposed between the thermally conductive metal plate and the plate-shaped temperature regulating unit, and/or, disposed between the thermally conductive metal plate and the liquid cooling temperature control unit;

the temperature detection module includes at least two thermocouples to be mounted to the cathode and anode of the fuel cell under test, respectively, to obtain the measured temperature of the cathode and anode;

the control module includes: a temperature controller, connected to the temperature detection module, and connected to the temperature regulating module, configured to acquire the measured temperature acquired by the temperature detection module, and respectively adjust the operation states of the two temperature regulating modules according to the magnitude relationship between the measured temperature and the target temperature, so as to adjust temperature of the cathode and the anode of the fuel cell under test to tend to the target temperature;

the first preset value is greater than or equal to 30 cm$^2$;

a temperature control method used for the temperature control system for fuel cell, comprising:

obtaining measured temperature and target temperature of the cathode and anode of the fuel cell under test;

according to a magnitude relationship between the measured temperature and the target temperature, respectively providing an external temperature for surfaces of two oppositely arranged end plates of the fuel cell under test by the at least two temperature regulating modules, and changing an external temperature provided by the temperature regulating module for the end plates of the fuel cell under test by controlling an external temperature adjustment power of the temperature regulating module, so as to respectively adjust the temperatures of the surfaces of the two end plates, wherein when the measured temperature is greater than the target temperature, a temperature range of the external temperature is less than the measured temperature, and when the measured temperature is less than the target temperature, the temperature range of the external temperature is greater than the measured temperature;

when the at least two temperature regulating modules respectively provide the external temperature for the surfaces of two oppositely arranged end plates of the fuel cell under test, if the measured temperature changes reversely with time towards the target temperature, increasing or decreasing the external temperature adjusting power to increase or decrease the external temperature, so that the measured temperature changes positively toward the target temperature until the external temperature adjusting power reaches an extreme value within an adjustment range;

place the fuel cell under test on a fuel cell test bench, connect a reactant supply interface of the test bench with a load interface, to ensure that a gas tightness test of the fuel cell under test is qualified;

set and adjust parameters of the test bench according to a stoichiometric ratio of cathode and anode intake gas, cathode and anode intake gas temperature, cathode and anode intake gas relative humidity, cathode and anode intake gas pressure, so that an intake gas flow, intake gas temperature, intake gas humidity and intake gas pressure are within a specified parameter range;

turn on the coolant circulator and the temperature controller, set the target temperature Ttarget of the temperature controller according to operating temperature of a single fuel cell specified in a test condition, and set control temperature of the temperature-controllable liquid in the coolant circulator as Tcool, wherein, according to the operating temperature of the single fuel cell under test as 80° C., set the target temperature Ttarget of the temperature controller as 80° C., and set the control temperature Tcool of the temperature-controllable liquid in the coolant circulator as 10° C.;

start a test according to the test condition, start a performance test of the fuel cell under test, and read a real-time temperature Treal that the thermocouple inserted into the fuel cell under test feeds back to the temperature controller, including a real-time temperature Treal_1 that a first thermocouple feeds back to the temperature controller and read by the temperature controller and a real-time temperature Treal_2 that a second thermocouple feeds back to the temperature controller and read by the temperature controller;

compare the target temperature Ttarget of the temperature controller with the real-time temperature Treal of a single fuel cell, and if Ttarget is greater than Treal, automatically increase heating power of the semiconductor chilling plate by the temperature controller; compare the target temperature 80° C. of the temperature controller with the real-time temperature $Treal\_1$ that the first thermocouple feeds back to the temperature controller, and if $Treal\_1$ is less than 80° C., the heating power of the four semiconductor chilling plates outside the anode of the fuel cell under test is automatically increased by the temperature controller; if $Treal\_1$ is greater than 80° C., cooling power of the four semiconductor chilling plates outside the anode of the fuel cell under test is automatically increased by the temperature controller;

compare the target temperature 80° C. of the temperature controller with the real-time temperature $Treal\_2$ that the second thermocouple feeds back to the temperature controller, and if $Treal\_2$ is less than 80° C., the heating power of the four semiconductor chilling plates outside the cathode of the fuel cell under test is automatically increased by the temperature controller; if $Treal\_2$ is greater than 80° C., the cooling power of the four semiconductor chilling plates outside the cathode terminal of the fuel cell under test is automatically increased by the temperature controller;

if Treal is still greater than Ttarget when the cooling power of semiconductor chilling plate reaches the maximum, a control temperature Tcool of the temperature-controllable liquid of the coolant circulator is reduced to further increase the cooling power of the semiconductor chilling plate; if $Treal\_1$ and $Treal\_2$ are still greater than 80° C. under the above implementation steps, the control temperature Tcool of the temperature-controllable liquid of the coolant circulator is reduced to 5° C., thereby further enhancing the cooling power of the semiconductor chilling plate;

repeat the above steps until the difference between the target temperature of 80° C. of the temperature controller and the real-time temperature $Treal\_1$ and $Treal\_2$ that the thermocouple feeds back to the temperature controller do not exceed the set temperature difference value Tdiff.

\* \* \* \* \*